US008057378B2

(12) United States Patent
Kozlova et al.

(10) Patent No.: US 8,057,378 B2
(45) Date of Patent: Nov. 15, 2011

(54) METHOD OF TREATMENT OF DREDGED MATERIAL FOR BENEFICIAL USE

(75) Inventors: Sofiya Kozlova, Yonkers, NY (US);
Semyon A. Shimanovich, Brooklyn, NY (US); Christian Meyer, Demarest, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1293 days.

(21) Appl. No.: 10/471,436

(22) PCT Filed: Mar. 18, 2002

(86) PCT No.: PCT/US02/08109
§ 371 (c)(1),
(2), (4) Date: Mar. 25, 2004

(87) PCT Pub. No.: WO02/074391
PCT Pub. Date: Sep. 26, 2002

(65) Prior Publication Data
US 2004/0158114 A1    Aug. 12, 2004

Related U.S. Application Data

(60) Provisional application No. 60/276,445, filed on Mar. 16, 2001.

(51) Int. Cl.
*C04B 18/04* (2006.01)

(52) U.S. Cl. .......... 588/257; 588/407; 588/901
(58) Field of Classification Search .......... 588/256, 588/257, 407, 313, 901
See application file for complete search history.

(56) References Cited

U.S. PATENT DOCUMENTS

| 5,304,710 A | | 4/1994 | Kigel et al. ............ 588/257 |
| 5,599,137 A | | 2/1997 | Stephenson et al. ........ 405/128 |
| 5,609,558 A | * | 3/1997 | Sasae et al. ............ 588/257 |
| 5,714,085 A | | 2/1998 | Eto et al. ............ 252/181 |
| 5,782,580 A | | 7/1998 | Aubert et al. ............ 405/128 |
| 5,795,285 A | | 8/1998 | McLaughlin et al. ........ 588/256 |
| 5,803,894 A | | 9/1998 | Kao et al. ............ 588/257 |
| 5,855,666 A | | 1/1999 | Kao et al. ............ 106/718 |
| 5,967,965 A | * | 10/1999 | Vyshkina et al. ............ 588/256 |
| 5,968,245 A | * | 10/1999 | Jones et al. ............ 106/277 |

* cited by examiner

*Primary Examiner* — Edward Johnson
(74) *Attorney, Agent, or Firm* — Baker Botts L.L.P.

(57) ABSTRACT

A method for the decontamination and solidification of dredged material is described. The method includes, in the following order, (a) adding a lime-based binder to dredged material to form a mixture; (b) letting the mixture cool to about ambient temperature; and (c) adding to the mixture a chelating agent. The order of the steps may not be reversed without affecting the effectiveness of the treatment of the dredged material. A method for producing filler containing decontaminated and solidified dredged material is also described. The method includes treating dredged material with a lime-based binder and a chelating agent and adding the resulting mixture to concrete.

19 Claims, 5 Drawing Sheets

Particle size distribution of natural dry dredged material (NYH dry) and
of dredged material after combined treatment (DMCJ)

Cumulative particle size distribution of natural dry dredged material (NYH dry) and of dredged material after combined treatment (DMCJ)

Light microscope observation, 100x magnification: Dry dredged material from Newtown Creek Optical microscope observation, 100x magnification:
Dry dredged material after combined treatment (DMCJ). Arrows mark agglomerates around oil products

METHOD OF TREATMENT OF DREDGED MATERIAL FOR BENEFICIAL USE

SPECIFICATION

This application claims priority to U.S. Provisional Application No. 60/276,445, filed Mar. 16, 2001, which is incorporated herein by reference in its entirety.

BACKGROUND OF THE INVENTION

1. Field of the Invention

This invention is directed to a method for the treatment of dredged material. More particularly, this invention is directed to a method to decontaminate and solidify dredged material so as to render it suitable for beneficial use.

2. Background Information

Harbors and waterways require shipping lanes to be dredged on a regular maintenance basis in order to prevent the shipping lanes from silting up. Material that is dredged out of port or harbor locations typically contains a wide range of toxic contaminants, from heavy metals to oils and pesticides. Three alternatives may be considered for management of dredged material: confined disposal, open-water disposal, and beneficial use.

Confined disposal is problematic since confined facilities must have all potential escape routes of the contaminants eliminated, including effluents during placement, surface runoff, leachates, direct uptake by plants and animals and volatilization to air. Open-water disposal is limited by the fact that the dumping of contaminated sediments in waters is not permitted under various legislative measures, including, for example, the Marine Protection, Research, and Sanctuaries Act. Accordingly, treatment of the contaminated dredged material for rendering it suitable for beneficial use is a most desirable alternative.

Several examples of beneficial use are available. For example, the dredged material may be used as beach nourishment, which may be necessary if natural replacement of material moved along the shoreline by littoral transport is not available. However, only the gravel and sand portion of dredged material is suitable for beach nourishment, making separation and decontamination obligatory. As a second example, dredged material may be used as manufactured topsoil; however, only fine particles are suitable for such use, so that separation and decontamination of clay and silt is required. In addition, when used for agricultural purposes, the material has to be suitably clean and must not contain excessive amounts of salts, which can make the material unusable for growth of most plants. A more promising beneficial use for dredged material is as a filler for composite materials. However, such use requires not only effective decontamination but also solidification of the dredged material.

One solution to the problem of treatment of contaminated dredged material is the use of chemical substances capable of neutralizing heavy metals and other toxins, such as the chelating agents described in U.S. Pat. No. 5,714,085 (herein incorporated by reference). For example, the chelating agents of U.S. Pat. No. 5,714,085 remove heavy metals and certain organic contaminants such as polychlorinated biphenyls. These chelating agents are advantageous when compared to microorganisms, which can remove organic contaminants but cannot remove heavy metals and other inorganic contaminants. However, the chelating agents of U.S. Pat. No. 5,714, 085 were developed only for decontamination, and not for solidification as well. Solidification of the dredged material is necessary to make it suitable as a filler for composite materials such as concrete.

None of the prior art, including U.S. Pat. No. 5,714,085, provides a commercially viable method that results both in decontamination and in solidification of the dredged material that renders the material suitable as a filler for composite materials.

SUMMARY OF THE INVENTION

Accordingly, it is an object of the invention to provide a method for the treatment of dredged material, where the method comprises, in the following order: adding to dredged material a lime-based binder to form a mixture; letting the mixture cool to about room temperature; and adding a chelating agent. This method results in decontamination and solidification of the dredged material and renders the material suitable as a filler for composite materials. The sequential steps of adding a lime based binder and then adding a chelating agent exhibit an unexpected synergistic effect in decontaminating the dredged material while solidifying the material.

A further object of the invention is to provide a method suitable for the treatment of both dry and wet dredged material.

A further object of the invention is to provide a method for the production of a filler containing dredged material treated first with a lime-based binder and then with a chelating agent.

One advantage of the method of the invention is that it provides a highly decontaminated solidified dredged material which makes it suitable for use as a filler for composite materials such as concrete.

DETAILED DESCRIPTION OF THE PREFERRED EMBODIMENTS

Figure 1:
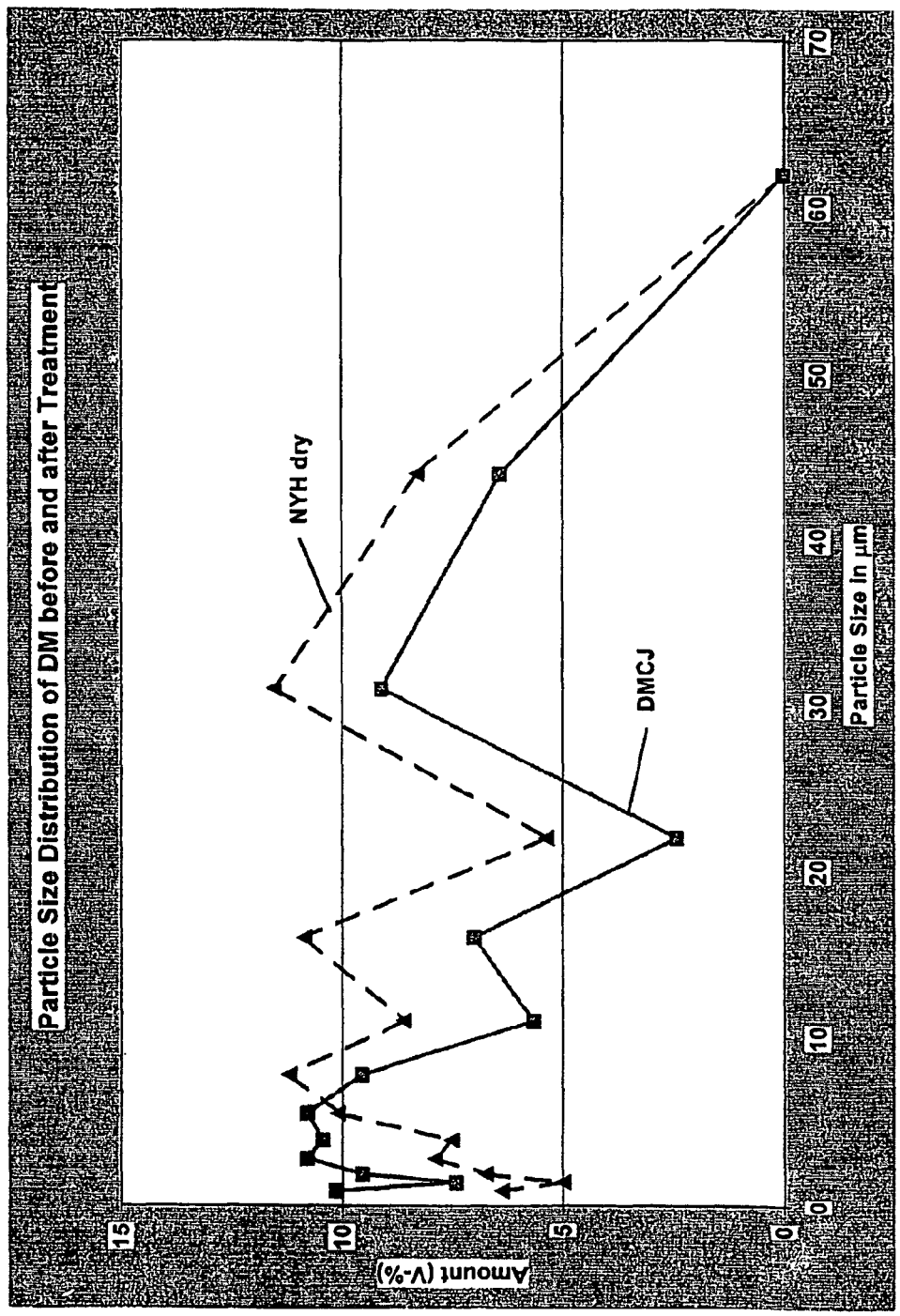
FIG. 1 shows the particle size distribution of natural dry dredged material ("NYH dry" in FIG. 1) and of dredged material after combined treatment with a lime-based binder and a chelating agent ("DMCJ" in FIG. 1).

The method of the present invention includes at least two separate steps carried out in sequence. The first of the two steps includes solidification of dredged material by treatment with a lime-based binder. In one exemplary embodiment, the binder is a pulverized quick-lime, such as CAL-MAX pulverized fine quick-lime available from Ash Grove Cement Co. Preferably, the pulverized quick-lime comprises at least 80% by weight of active calcium oxide, up to 1% by weight of magnesium oxide, up to 2% by weight of silica, up to 0.2% by weight of ferric oxide, and up to 0.2% by weight of aluminum oxide. Most preferably, the mean diameter of the particles of the pulverized quick-lime is about 45 μm (325 mesh). All of the quicklime material passed a no. 30 sieve. The phrase "active calcium oxide" is intended to mean calcium oxide that is capable of readily reacting with water at ambient temperature. The term "ambient temperature" as used herein refers to the atmospheric temperature at the location where treatment of the dredged material takes place. Once calcium oxide has reacted with water, it is no longer "active calcium oxide."

The hydration of the pulverized quick-lime results in raising the temperature of the mixture to about 212° F. and greatly reduces the water content and therefore the volume of the raw dredged material. This treatment solidifies the dredged material. After the dredged material has cooled to ambient temperature, it is suitable for further processing, either dried or wet. The term cooling is intended to refer to natural or passive cooling, rather than forced or active cooling.

The lime-based binder treatment changes the structure and texture of the dredged material. While the untreated material partly consists of clay-sand agglomerates with closed structure and similar particle size distribution as regular, but fine sand aggregate, after the lime-based binder treatment it exhibits a very fine, porous structure nearly without conglomeration. The particles are separated from each other, and if they are bound by the hydrated lime-based binder, these bonds can be broken with relative ease.

The lime-based binder treatment also changes the surface properties of the dredged material. The surface charge is altered, making the surface accessible to polar or charged substances such as water or superplasticizers. As side benefits, increased homogeneity and less saline material on the surface were observed. The odor diminished, which is an indication that volatile organics are either destroyed or bound.

The lime-based binder, in addition to causing dehydration and solidification, also causes a rise in the pH-level, which creates the basis for very effective decontamination of the dredged material.

The second of the two steps of the method of the present invention, which is subsequent to the first step, includes treatment of the dredged material with a chelating agent. Preferably, the chelating agent is capable of chelation of and formation of coordination compounds with chemical contaminants in the dredged material. For example, when the contaminant is a metal M, the chelating agent is capable of providing one or more coordinating moieties X which encapsulate the metal M to form a coordination compound comprising the structural unit $M(X)_n$, where n is the number of moieties X that coordinate the metal center. The number n depends on the nature of the metal. Such a chelating agent has the capability of encapsulation of pollutants, such as heavy metals and polychloride biphenyls (PCB). The treatment is relatively fast, reliable, and effective.

In one particularly advantageous exemplary embodiment of the invention, the chelating agent is one of the chelating agents described in U.S. Pat. No. 5,714,085, which can remove contaminants such as heavy metals and PCB. The compositions of two exemplary chelating agents in the form of solutions are described in Table 1:

TABLE 1

Chemical composition of exemplary solutions of chelating agents

| Ingredient | Concentration, g/liter | |
|---|---|---|
| | Chelating agent A | Chelating agent B |
| Sodium chloride | 44 | 83 |
| Potassium chloride | 87 | 125.3 |
| Potassium bromide | 6 | 9 |
| Calcium sulfate | 8 | 12 |

TABLE 1-continued

Chemical composition of exemplary solutions of chelating agents

| Ingredient | Concentration, g/liter | |
|---|---|---|
| | Chelating agent A | Chelating agent B |
| Lithium chloride | 1.7 | 2.4 |
| Barium chloride | 12 | 18 |
| Magnesium chloride | 8 | 12 |
| Strontium chloride | 4 | 6 |
| Cobalt chloride | 8 | 12 |
| Zinc chloride | 3 | 6 |
| Copper chloride | 3 | 6 |
| Tannin | 11 | 11.6 |
| Pyrolignous acid | Saturated solution | Saturated solution |

Chelating agents A and B were used separately to treat the dredged material. In one advantageous embodiment of the invention, the chelating agent is present in an amount of about 3% to about 10% by weight of the dredged material. The effectiveness of each of agents A and B was evaluated in terms of the degree of efflorescence of the chlorides of sodium, potassium, and other metals. Agent A was shown to be more effective than agent B: samples containing agent B showed intensive efflorescence of sodium, potassium and other chlorides, while samples containing agent A showed much lower efflorescence levels. It is believed that the ability of a chelating agent in removing metals such as sodium or potassium is a qualitative measure of its ability to decontaminate heavy metals. Accordingly, agent A is preferable as the chelating agent for the dredged material treatment described herein.

Treatment with a chelating agent alone does not seem to be a sufficient preparation of dredged material for further beneficial use because chelating agents generally provide for decontamination only. We have discovered that by first treating the dredged material with a lime-based binder and then treating the mixture of the dredged material and the lime-based binder with a chelating agent, one obtains decontamination of the dredged material to an extent greater than the effect of the chelating agent when used alone.

In accordance with the present invention, the order of the two steps described above, i.e. addition of a lime-based binder and subsequent addition of a chelating agent, may not be reversed without significantly reducing the effectiveness of the decontamination and solidification.

Figure 2:
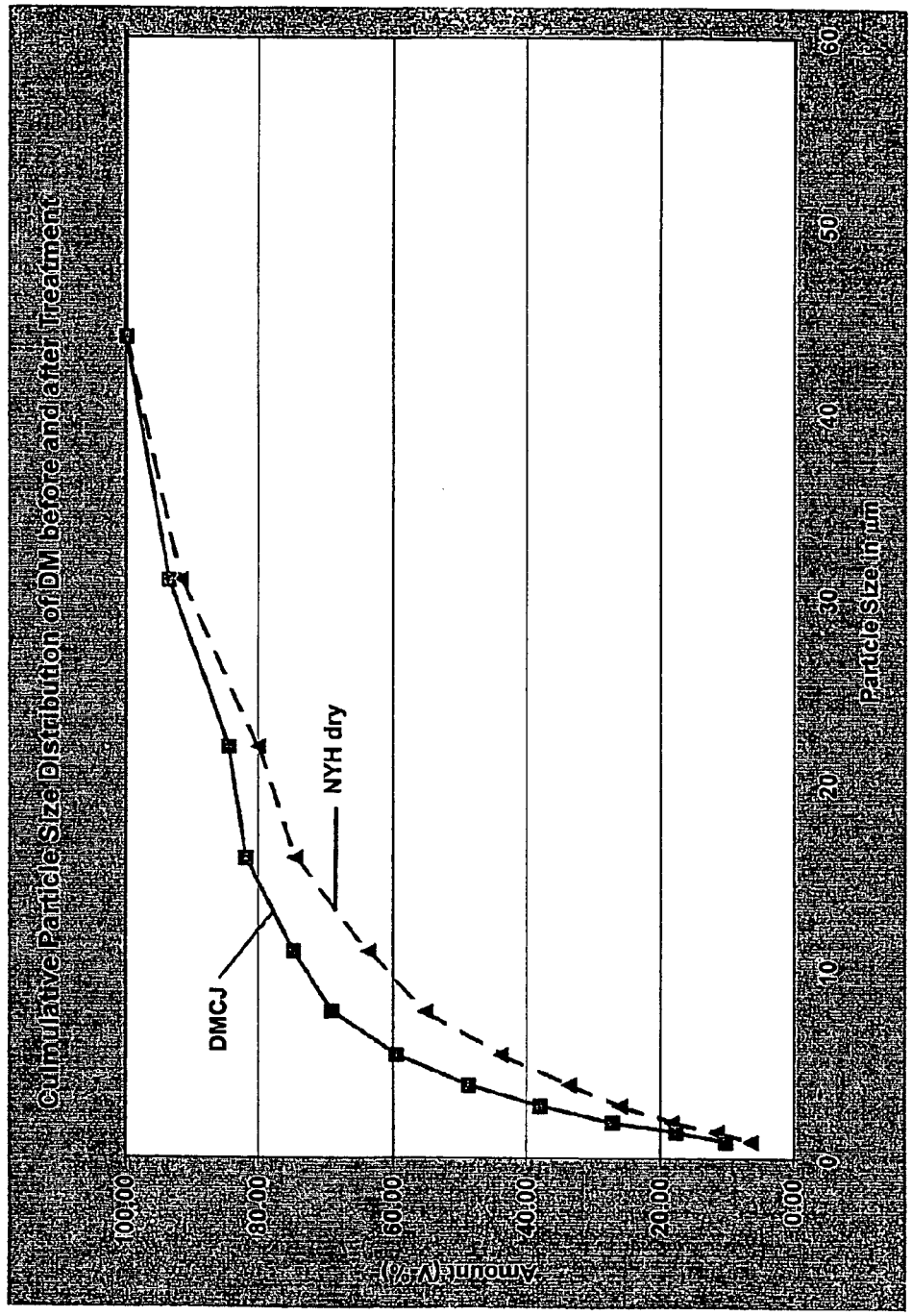
FIG. 2 shows the cumulative particle size distribution of natural dry dredged material (NYH dry) and of dredged material after treatment with a lime-based binder and a chelating agent (DMCJ).
Figure 3:
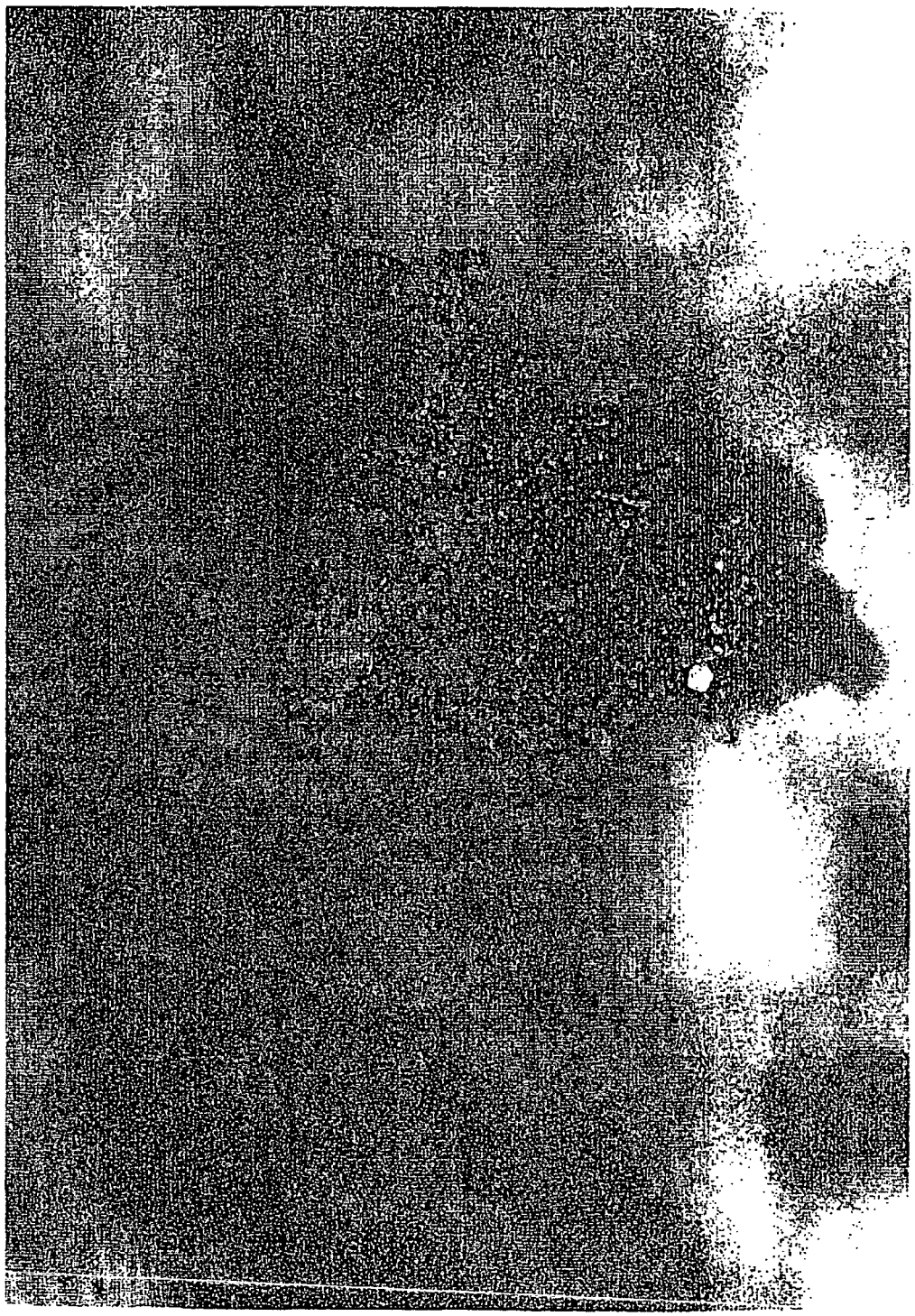
FIG. 3 shows an optical microscope observation of dry dredged material at 100× magnification.
Figure 4:
FIG. 4 shows an optical microscope observation of dry dredged material after treatment with a lime-based binder and a chelating agent at 100× magnification. The arrows mark agglomerates around oil products.
Figure 5:
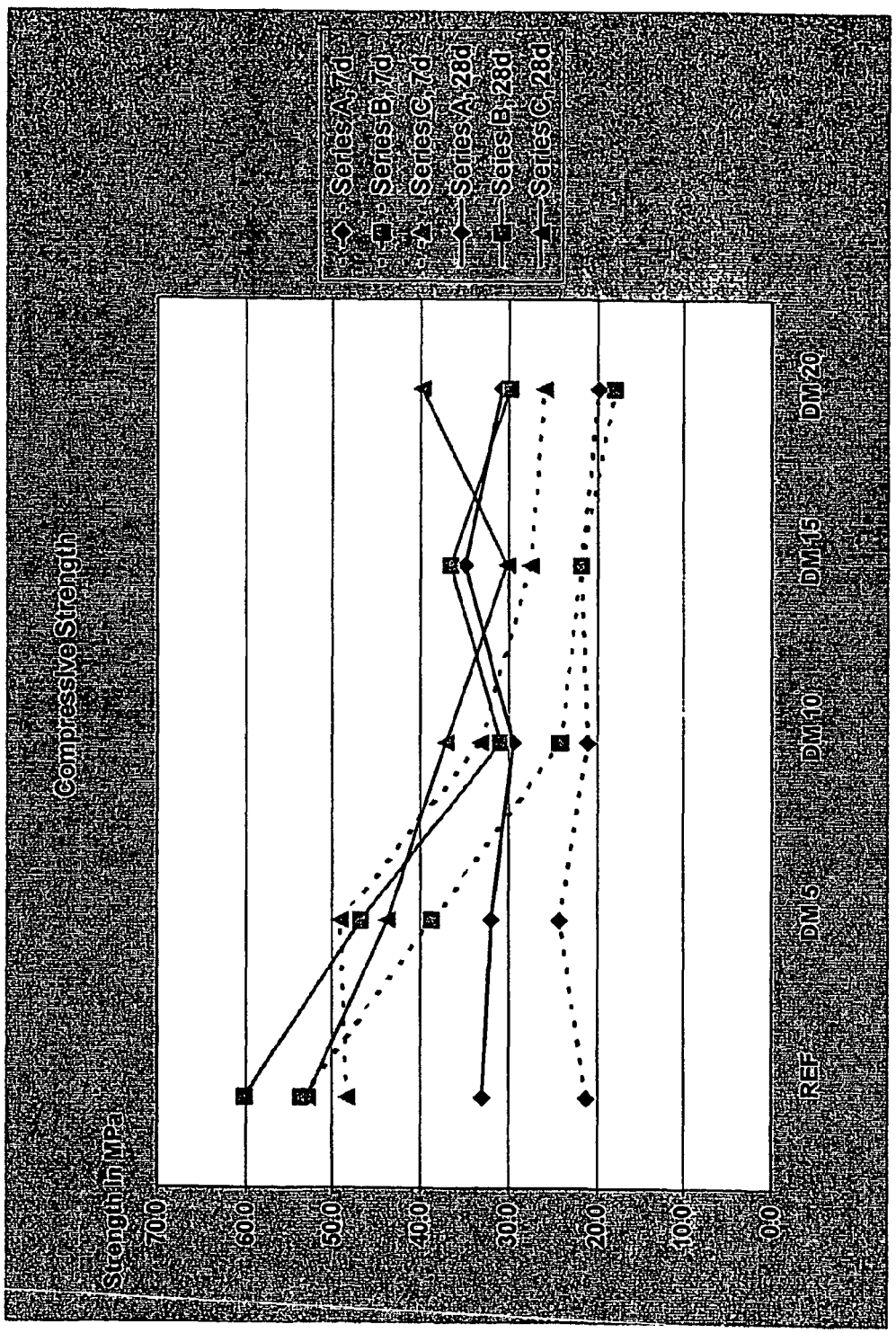
FIG. 5 shows plots of compressive strength versus dredged material ("DM" in FIG. 5) content after 7 and 28 days.

The combined treatment of the present invention causes a shift to finer particle sizes, as illustrated in FIGS. 1 and 2. This shift indicates that the surface structure is altered and that conglomerates, especially around oil products, are either destroyed or spread out. In the material after treatment, the agglomerates of oil products are very small as compared to the untreated dredged material, as evidenced in FIGS. 3 and 4, which show microscope observations at ×100 magnification of the dredged material before treatment and after the combined treatment of the present invention, respectively.

To study the effectiveness of the combined treatment of the present invention, dredged materials were subjected to a leaching test following the Environmental Protection Agency Toxicity Characteristic Leaching Procedure as described in Federal Register Vol. 51, No. 216, November 1986, Rules and Regulations. Three samples were analyzed: an untreated reference sample (raw dredged material), a sample treated only with chelating agent A, and a sample which had undergone the combined treatment of the present invention. The results of the test are summarized in Table 2.

TABLE 2

Results of chemical analysis (values are in ppm of dry material)

| Substance | Natural Dredged Material ('DM') | Dredged material treated with chelating agent A | Dredged material treated with lime-based binder and chelating agent A |
|---|---|---|---|
| Leachable Cyanide | 0.27 | ND* (<0.1) | ND (<0.1) |
| Cadmium | 0.22 | 0.20 | ND (<0.02) |
| Lead | 0.38 | 0.53 | 0.17 |

ND = not detectable

As can be seen from Table 2, the data exhibit the effectiveness of the combined treatment. The treatment with only chelating agent A is ineffective in reducing the amount of heavy metals detectable in a leaching test—in fact, a larger fraction of lead present in the dredged material leached out than in the untreated sample. In contrast, the combined treatment of the present invention considerably reduces both leachable cyanide and heavy metals.

The treated dredged material of the present invention may be used as a filler for concrete or mortar compositions. In order to evaluate the viability of the method of the present invention, properties of both fresh and hardened concrete obtained with both untreated and treated dredged material were tested. The behavior of concrete when mixed with untreated dredged material provides reference data, which can be used to assess the effectiveness of treatment procedures.

The treatment of the dredged material includes the following steps. The dredged material and the lime-based binder are mixed. Preferably, the lime-based binder is in the amount ranging from about 3% to about 75% by weight of the dredged material. The hydration of the lime-based binder is accompanied by generation of heat and reduces the water content of the dredged material drastically. A solid mixture is formed which is allowed to cool down to about ambient temperature and is then mixed with a chelating agent, preferably chelating agent A described above, to form a new mixture. The water content of the chelating agent solution hydrates the lime-based binder, so that the new mixture remains solid. The new mixture may be placed in a rotary dryer to form chips, or in a granulator to form granules. The chips, granules, or combination thereof were dried to a sufficient hardness and ground in a ball mill to produce a filler comprising particles, preferably of about 10 to about 150 µm in diameter, of decontaminated and solidified dredged material. In one exemplary embodiment of the invention, the drying period is less than or equal to two weeks.

The filler is particularly suitable as an additive to a composite material if it is pulverized, preferably to a particle size of about 10 to about 150 µm in diameter. In one embodiment of the invention, the composite material is concrete. Preferably, the composite material is selected from the group consisting of cement-based concrete and polymer concrete. In another embodiment of the invention, the composite material is selected from the group consisting of cement, a mixture of cementitious materials, a mixture of cementitious materials and sand, a mixture of cementitious materials and gravel aggregate, or any combination thereof.

Prior mixing of cement and the chelating agent does not strongly affect the concrete or mortar properties. In contrast, in the preferred mixing procedure, the chelating agent is administered to the mix containing the lime-based binder after the drying and cooling-off period, which leads to an unexpectedly large decrease in leachable contaminants from the concrete containing dredged material.

Leaching tests were conducted on mortar samples containing 20% dredged material. The results of the leaching tests are shown in Table 3. Referring to Table 3, Sample 23 contained untreated dredged material, sample 24 was treated with chelating agent A, and samples 21 and 22 were treated with two variations of the combined treatment, i.e. first adding the lime-based binder, and then adding the chelating agent before or after the mixture of the dredged material and the lime-based binder has cooled to about ambient temperature.

TABLE 3

Results of chemical analysis of mortar samples (in ppm)

| | Sample #23 | Sample #24 | Sample #22 | Sample #21 |
|---|---|---|---|---|
| Prior dredged material treatment | — | Chelating agent A | Lime-based binder and chelating agent A | Lime-based binder and chelating agent A after cooling period |
| Leachable cyanide | 1.22 | 0.82 | 0.44 | 0.41 |
| Cadmium | ND < 0.02 | ND < 0.02 | ND < 0.02 | ND < 0.02 |
| Lead | ND < 0.01 | ND < 0.01 | ND < 0.01 | ND < 0.01 |

ND = not detectable

As can be seen from Table 3, both variations of the combined treatment in accordance with the present invention are more effective in substantially reducing the amount of leachable cyanide than treatment with only chelating agent A or no treatment. The concentrations of heavy metals analyzed were too low to allow comparison among the four samples.

Without wishing to be bound by any theory or mechanism, it is believed that the superior decontamination effect of the combined treatment of the invention relative to the treatment with a chelating agent alone is due to the deconglomeration of the dredged material upon treatment with lime-based binder. As discussed above, the dredged material after deconglomeration exhibits a very fine, porous structure. This structure is more effectively treatable by the chelating agent than the structure of dredged material which has not been treated with lime-based binder, as shown in Tables 2 and 3. The order in which the chelating agent and the lime-based binder are added is therefore critical in enabling the method of the invention to achieve a level of decontamination which is superior to that obtained by treatment with the chelating agent alone, which does not decontaminate dredged material effectively, or with the lime based binder alone, which only solidifies the dredged material.

The effect of the filler on the strength of concrete or mortar compositions was also investigated and is shown in Table 4.

TABLE 4

Mortar strength with filler comprising treated dredged material

| Filler, % in cement | Type of treatment | Aggregate/ Cement ratio | 7-Day compressive strength (MPa) | 28-Day compressive strength (MPa) |
|---|---|---|---|---|
| 0 | None | 2.25 | 21.1 | 33.0 |
| 45 | None | 2.25 | 23.3 | 29.6 |
| 45 | Chelating Agent A | 2.25 | 23.4 | 27.2 |
| 45 | Lime-Based Binder | 2.25 | 26.6 | 38.6 |
| 45 | Combined | 2.25 | 22.2 | 35.9 |

TABLE 4-continued

Mortar strength with filler comprising treated dredged material

| Filler, % in cement | Type of treatment | Aggregate/ Cement ratio | 7-Day compressive strength (MPa) | 28-Day compressive strength (MPa) |
|---|---|---|---|---|
| 45 | None | 3.0 | 23.3 | 29.1 |
| 45 | Chelating Agent A | 3.0 | 22.2 | 25.9 |
| 45 | Lime-Based Binder | 3.0 | 28.0 | 37.6 |
| 45 | Combined | 3.0 | 23.1 | 37.3 |

Table 4 shows that the compressive strength of the mortar containing the filler obtained from the combined treatment of the present invention is comparable, and in some cases superior, to the mortar strength obtained with no treatment or with treatment with chelating agent A alone. Thus, in addition to the benefit of providing superior decontamination as discussed in Table 3, the combined treatment if the present invention also provides good strength characteristics.

Another method for the production of a composite material having solidified dredged material as a filler comprises as a first step adding untreated dredged material to a composite material to form a mixture. In one embodiment of the invention, the composite material is concrete. In another embodiment of the invention, the composite material is selected from the group consisting of cement, a mixture of cementitious materials, a mixture of cementitious materials and sand, a mixture of cementitious materials and gravel aggregate, or any combination thereof. A lime-based binder and a chelating agent, preferably chelating agent A, are then added in this order to the mixture. The mixture is then allowed to cool to about ambient temperature.

It should be understood that various changes and modifications to the preferred embodiments described herein will be apparent to those skilled in the art without departing from the spirit and scope of this invention, the scope being defined by the appended claims.

The invention claimed is:

1. A method for the decontamination and solidification of a dredged material, wherein the dredged material comprises clay-sand agglomerates having a closed structure and an initial average particle size, comprising:
   (a) adding a pulverized quick-lime to the dredged material to form a mixture, the mixture comprising deconglomerated dredged material having a porous structure and an average particle size smaller than the initial average particle size; and
   (b) adding a chelating agent to the mixture,
   wherein the chelating agent is a chemical composition providing chelation of and formation of coordination compounds with chemical contaminants in the dredged material, and
   wherein the chelating agent comprises in solution sodium chloride, potassium chloride, potassium bromide, calcium sulfate, lithium chloride, barium chloride, magnesium chloride, strontium chloride, cobalt chloride, zinc chloride, copper chloride, tannin and pyrolignous acid.

2. The method of claim 1, wherein adding the chelating agent to the mixture comprises adding the chelating agent to the mixture after the mixture has cooled to about ambient temperature.

3. The method of claim 1, wherein the pulverized quick-lime comprises quick-lime particles having a mean diameter of about 45 μm.

4. The method of claim 1, wherein the pulverized quick-lime comprises active calcium oxide, magnesium oxide, silica, ferric oxide, and aluminum oxide.

5. The method of claim 4, wherein the pulverized quick-lime comprises at least 80% by weight of active calcium oxide, up to 1% by weight of magnesium oxide, up to 2% by weight of silica, up to 0.2% by weight of ferric oxide, and up to 0.2% by weight of aluminum oxide.

6. A method for the decontamination and solidification of a dredged material, comprising, in the following order:
   (a) adding a lime-based binder to the dredged material to form a mixture;
   (b) letting the mixture cool to about room temperature; and
   (c) adding a chelating agent to the mixture,
   wherein the chelating agent comprises in solution sodium chloride, potassium chloride, potassium bromide, calcium sulfate, lithium chloride, barium chloride, magnesium chloride, strontium chloride, cobalt chloride, zinc chloride, copper chloride, tannin and pyrolignous acid.

7. The method of claim 6, wherein the chelating agent comprises in solution sodium chloride in a concentration of about 44 g/liter, potassium chloride in a concentration of about 87 g/liter, potassium bromide in a concentration of about 6 g/liter, calcium sulfate in a concentration of about 8 g/liter, lithium chloride in a concentration of about 1.7 g/liter, barium chloride in a concentration of about 12 g/liter, magnesium chloride in a concentration of about 8 g/liter, strontium chloride in a concentration of about 4 g/liter, cobalt chloride in a concentration of about 8 g/liter, zinc chloride in a concentration of about 3 g/liter, copper chloride in a concentration of about 3 g/liter, tannin in a concentration of about 11 g/liter, and pyrolignous acid in a concentration saturating the solution.

8. A method for producing a filler for a composite material, comprising:
   (a) adding a pulverized quick-lime to a dredged material comprising clay-sand agglomerates having a closed structure and an initial average particle size to form a first mixture, the first mixture comprising deconglomerated dredged material having a porous structure and an average particle size smaller than the initial average particle size;
   (b) adding a chelating agent to the first mixture to form a second mixture;
   (c) forming from the second mixture at least one of chips, granules, and a combination thereof;
   (d) drying the at least one of chips, granules, and a combination thereof formed in (c); and
   (e) grinding the at least one of chips, granules, and a combination thereof dried in (d) to form the filler, the drying and the grinding being carried out at about ambient temperature,
   wherein the chelating agent comprises a chemical composition for chelation of and formation of coordination compounds with chemical contaminants in the dredged material, and
   wherein the chelating agent comprises in solution sodium chloride, potassium chloride, potassium bromide, calcium sulfate, lithium chloride, barium chloride, magnesium chloride, strontium chloride, cobalt chloride, zinc chloride, copper chloride, tannin and pyrolignous acid.

9. The method of claim 8, wherein after the grinding step the filler comprises particles of treated dredged material having a diameter of about 10 μm to about 150 μm.

10. The method of claim 8, wherein the pulverized quick-lime is added in the amount ranging from about 3% to about 75% by weight of the dredged material.

11. The method of claim 8, wherein the filler is used as an additive to a composite material.

12. The method of claim 11, wherein the composite material is selected from the group consisting of cement, a mixture of cementitious materials, a mixture of cementitious materials and sand, a mixture of cementitious materials and gravel aggregate, or any combination thereof.

13. The method of claim 11, wherein the composite material is concrete.

14. The method of claim 8, wherein adding the chelating agent to the first mixture comprises adding the chelating agent to the first mixture after the first mixture has cooled to about ambient temperature.

15. The method of claim 8, wherein the pulverized quick-lime comprises quick-lime particles having a mean diameter of about 45 µm.

16. The method of claim 8, wherein the pulverized quick-lime comprises active calcium oxide, magnesium oxide, silica, ferric oxide, and aluminum oxide.

17. The method of claim 16, wherein the pulverized quick-lime comprises at least 80% by weight of active calcium oxide, up to 1% by weight of magnesium oxide, up to 2% by weight of silica, up to 0.2% by weight of ferric oxide, and up to 0.2% by weight of aluminum oxide.

18. The method for producing a filler for a composite material, comprising, in the following order:
   (a) adding a lime-based binder to a dredged material to form a mixture;
   (b) letting the mixture cool to about ambient temperature;
   (c) adding a chelating agent to the mixture form a new mixture;
   (d) forming from the new mixture at least one of chips, granules, and a combination thereof;
   (e) drying the at least one of chips, granules, and a combination thereof formed in step (d); and
   (f) grinding the at least one of chips, granules, and a combination thereof dried in step (e) to form the filler, the drying and the grinding being carried out at about ambient temperature,
   wherein the chelating agent comprises in solution sodium chloride, potassium chloride, potassium bromide, calcium sulfate, lithium chloride, barium chloride, magnesium chloride, strontium chloride, cobalt chloride, zinc chloride, copper chloride, tannin and pyrolignous acid.

19. The method of claim 18, wherein the chelating agent comprises a solution comprising sodium chloride in a concentration of about 44 g/liter, potassium chloride in a concentration of about 87 g/liter, potassium bromide in a concentration of about 6 g/liter, calcium sulfate in a concentration of about 8 g/liter, lithium chloride in a concentration of about 1.7 g/liter, barium chloride in a concentration of about 12 g/liter, magnesium chloride in a concentration of about 8 g/liter, strontium chloride in a concentration of about 4 g/liter, cobalt chloride in a concentration of about 8 g/liter, zinc chloride in a concentration of about 3 g/liter, copper chloride in a concentration of about 3 g/liter, tannin in a concentration of about 11 g/liter, and pyrolignous acid in a concentration saturating the solution.

* * * * *